(12) United States Patent
Thooft et al.

(10) Patent No.: US 11,066,245 B2
(45) Date of Patent: Jul. 20, 2021

(54) CONVEYOR TRUSS ELEVATION APPARATUS, SYSTEMS, AND METHODS

(71) Applicant: Superior Industries, Inc., Morris, MN (US)

(72) Inventors: Travis Thooft, Morris, MN (US); Zachary Ourada, Morris, MN (US)

(73) Assignee: Superior Industries, Inc., Morris, MN (US)

( * ) Notice: Subject to any disclaimer, the term of this patent is extended or adjusted under 35 U.S.C. 154(b) by 0 days.

(21) Appl. No.: 16/761,220

(22) PCT Filed: Nov. 5, 2018

(86) PCT No.: PCT/US2018/059266
§ 371 (c)(1),
(2) Date: May 1, 2020

(87) PCT Pub. No.: WO2019/090258
PCT Pub. Date: May 9, 2019

(65) Prior Publication Data
US 2020/0354151 A1 Nov. 12, 2020

Related U.S. Application Data

(60) Provisional application No. 62/581,143, filed on Nov. 3, 2017.

(51) Int. Cl.
*B65G 21/14* (2006.01)
*B65G 21/02* (2006.01)
*B65G 41/00* (2006.01)
*B65G 15/26* (2006.01)
*B65G 23/04* (2006.01)

(52) U.S. Cl.
CPC .......... *B65G 21/14* (2013.01); *B65G 15/26* (2013.01); *B65G 21/02* (2013.01); *B65G 41/002* (2013.01); *B65G 23/04* (2013.01); *B65G 2201/042* (2013.01)

(58) Field of Classification Search
CPC ........ B65G 21/14; B65G 23/04; B65G 21/02; B65G 41/002; B65G 2201/042; B65G 15/26
See application file for complete search history.

(56) References Cited

U.S. PATENT DOCUMENTS 5,203,442 A * 4/1993 Oury .................. B28C 5/4255
                                                         198/313
5,351,809 A * 10/1994 Gilmore .............. B65G 21/14
                                                         198/594

(Continued)

OTHER PUBLICATIONS

"Superstacker 48"×150"", Brochure and Pictures of Superstacker, KPI-JCI Astec Companies, more than one year prior to filing date, 9 pages.

(Continued)

*Primary Examiner* — Mark A Deuble
(74) *Attorney, Agent, or Firm* — Todd R. Fronek; Larkin Hoffman Daly & Lindgren Ltd.

(57) ABSTRACT

Conveyor elevation apparatus, systems and methods are provided. Some embodiments include a stmt having three frame sections. In some embodiments at least two of the frame sections comprise longitudinal supports joined by bracing.

25 Claims, 17 Drawing Sheets

(56) References Cited

U.S. PATENT DOCUMENTS

| | | | | |
|---|---|---|---|---|
| 6,006,893 A | * | 12/1999 | Gilmore | B65G 67/08 198/588 |
| 6,360,876 B1 | * | 3/2002 | Nohl | B65G 41/008 198/302 |
| 6,484,862 B1 | * | 11/2002 | Gilmore | B65G 21/14 193/35 TE |
| 6,929,113 B1 | * | 8/2005 | Hoover | B65G 21/14 198/313 |
| 7,284,947 B1 | * | 10/2007 | Felton | B65G 21/14 198/302 |
| 2010/0135758 A1 | * | 6/2010 | Gallione | B65G 21/14 414/505 |
| 2012/0298478 A1 | * | 11/2012 | Friesen | B65G 65/42 198/311 |
| 2015/0144465 A1 | * | 5/2015 | Rausch | B65G 21/14 198/812 |
| 2017/0274811 A1 | * | 9/2017 | Esch | B65G 21/14 |
| 2019/0016536 A1 | * | 1/2019 | Campbell | B65G 47/44 |

OTHER PUBLICATIONS

"TeleStacker Conveyor", Operator's and Maintenance Manual, Superior Industries, Sep. 2016, 93 pages.

* cited by examiner

CONVEYOR TRUSS ELEVATION APPARATUS, SYSTEMS, AND METHODS

DESCRIPTION

Figure 16:
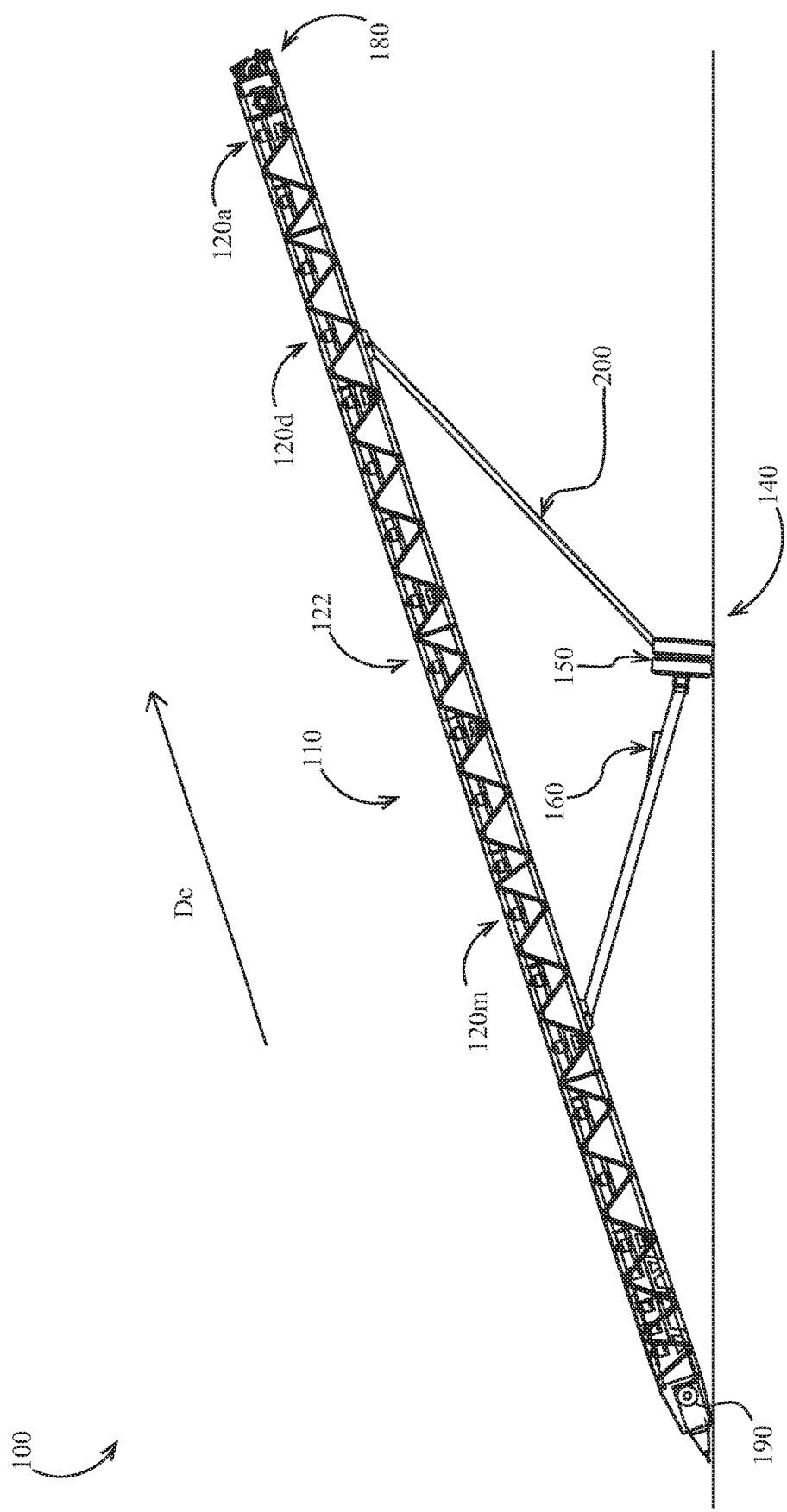
FIG. 16 is a side elevation view of an embodiment of a conveyor in an operational configuration.

Referring to the drawings, wherein like reference numerals designate identical or corresponding parts throughout the several views, FIG. 16 illustrates a conveyor 100 having a truss 110. The truss 110 operably supports a plurality of idler assemblies 120 (e.g., forwardmost idler assemblies of each frame section 120m, 120d, and 120a). The idler assemblies 120 operably support an endless belt 122. The truss 110 optionally operably supports a tail pulley 190. The truss 110 optionally operably supports a head pulley 180. In some embodiments the truss 110 comprises a first conveyor section and a second conveyor section that is telescopically movable relative to the first conveyor section as disclosed in U.S. Pat. No. 7,618,231, hereby incorporated by reference herein in its entirety. The head pulley 180 and tail pulley 190 optionally operably support the belt 122 in operation for conveying materials (e.g., aggregate materials such as rock, stone, sand, gravel, minerals, etc.) along a conveyance direction Dc. In some embodiments the head pulley 180 is driven (e.g., by a motor) in order to advance the belt 122.

The conveyor 100 optionally includes a support assembly 140. The support assembly 140 optionally includes a strut 200 supporting (e.g., pivotally coupled to) the truss 110. The strut 200 is optionally supported by (e.g., pivotally coupled to) an undercarriage 150 (e.g., having wheels or tracks for radial travel or "slewing" of the conveyor). The undercarriage 150 and/or other components and subsystems of the conveyor optionally have common features and/or functionality with the undercarriage embodiments disclosed in U.S. Pat. Nos. 6,360,876 and 7,284,947, both of which are hereby incorporated herein by reference. The strut is optionally reconfigurable between retracted and extended configurations for elevating (i.e., raising and lowering or "luffing" the truss 110. A strut 160 (e.g., a fixed-length or telescoping strut) is optionally coupled (e.g., pivotally coupled) at a first end thereof to the undercarriage 150; the strut 160 is optionally coupled (e.g., pivotally coupled) at a second end thereof to the truss 110.

Referring to FIGS. 1-13, the strut 200 is illustrated in more detail according to some embodiments. In some embodiments, the strut comprises three or more frames. In some embodiments, two or more of the frames (e.g., the bottom two frames, three frames, etc.) include one or more internal braces (e.g., braces disposed at least partially or entirely between longitudinally extending beams of the frame and/or another frame slidingly engaged with the frame).

Figure 10:
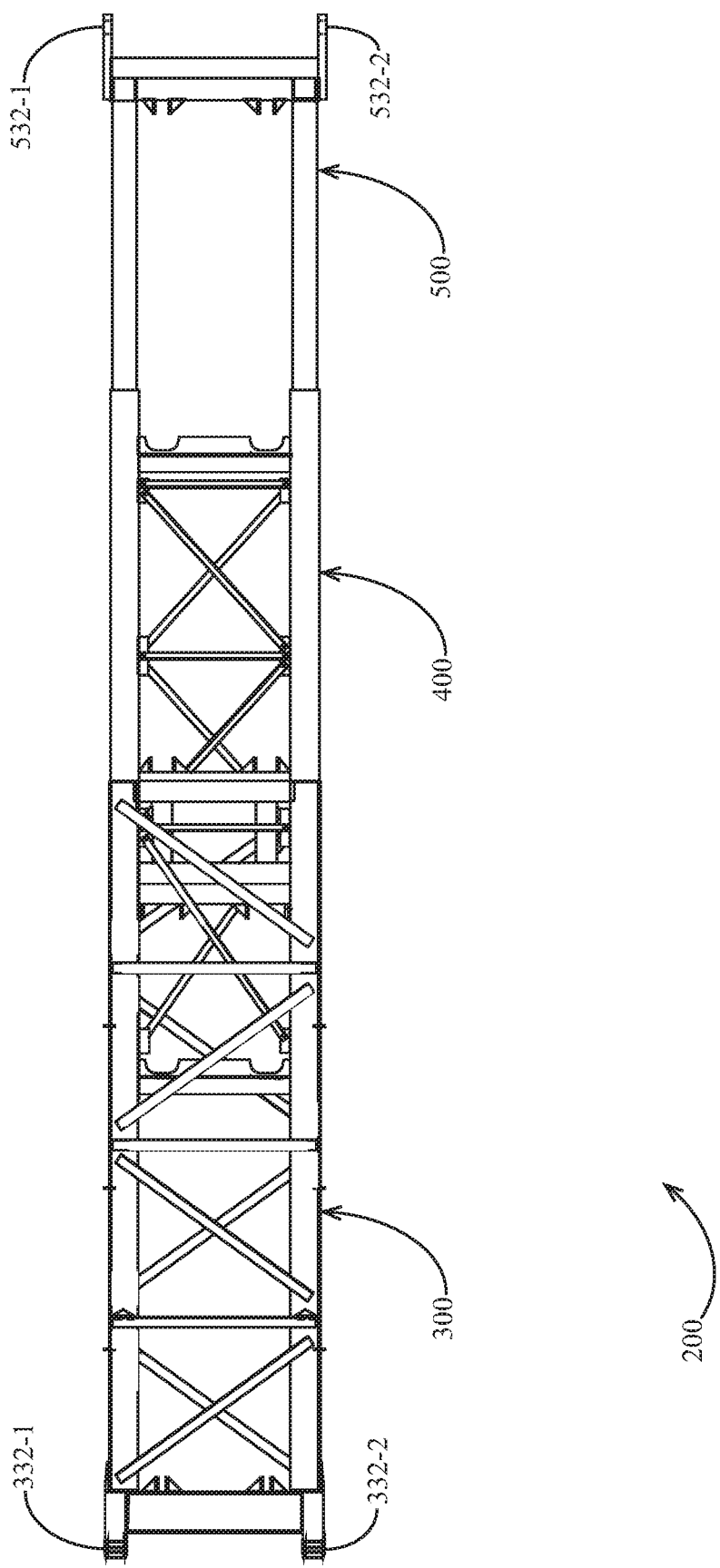
FIG. 10 is a plan view of an embodiment of a strut in an extended configuration.
Figure 11:
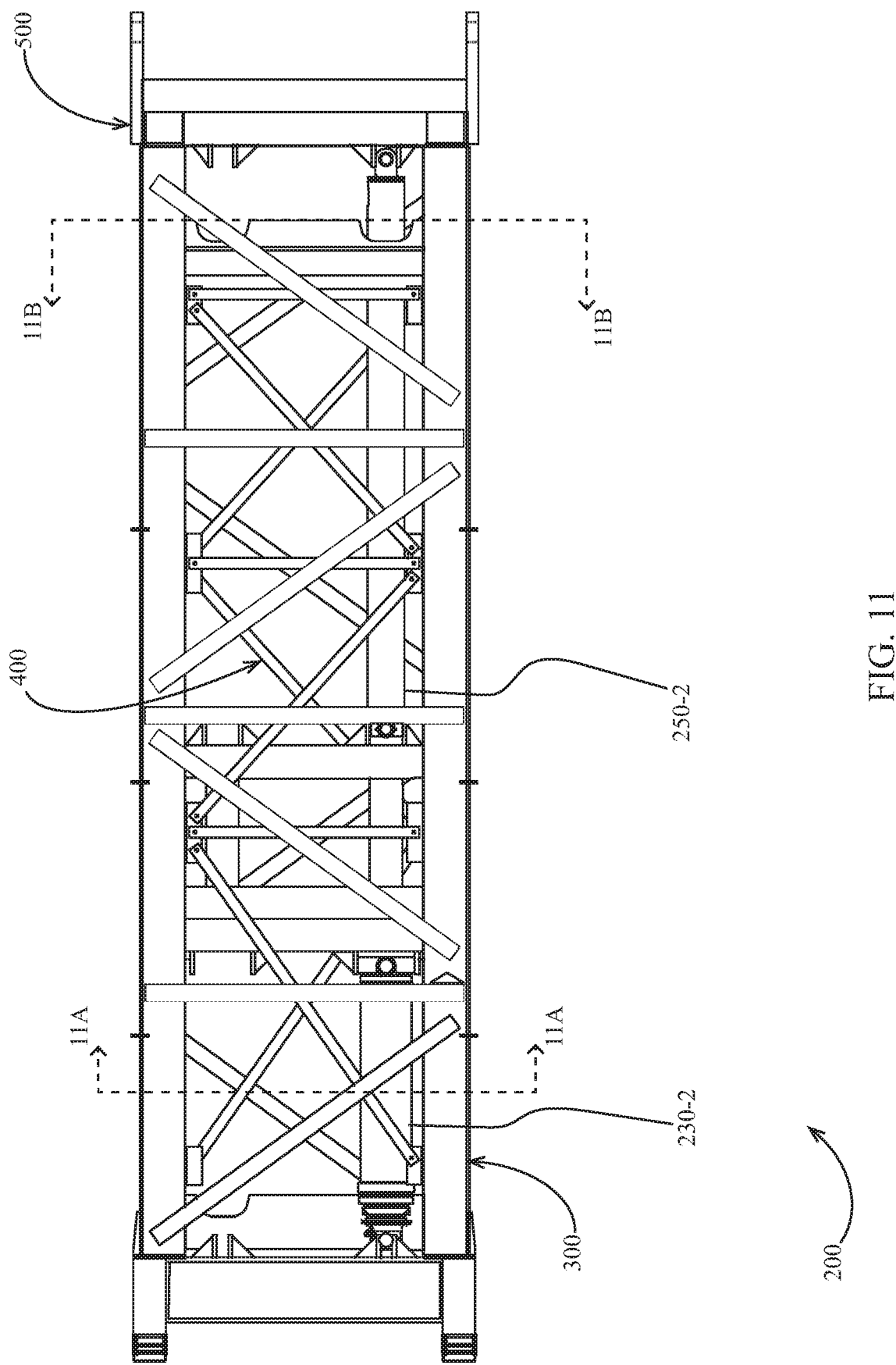
FIG. 11 is a plan view of the strut of FIG. 10 in a retracted configuration.

Referring to FIGS. 10 and 11, in some embodiments the strut 200 comprises a lower frame 300, an intermediate frame 400 and an upper frame 500. The lower frame 300 is optionally pivotally coupled at a lower end thereof to the undercarriage 150 (e.g., at pivot supports 332-1, 332-2). The intermediate frame 400 is optionally slidingly engaged with the lower frame 300 for sliding between retracted (e.g., FIG. 11, having a shorter overall length than FIG. 10) and extended (e.g., FIG. 10, having a longer overall length than FIG. 11) configurations of the strut 200. In the retracted configuration, the lower frame 300, the intermediate frame 400 and the upper frame 500 are nested with respect to one another such that an overall length of the strut 200 in the retracted configuration is approximately the length of any one of lower frame 300, intermediate frame 400 and upper frame 500. In the extended configuration, the lower frame 300, intermediate frame 400 and upper frame 500 are positioned relative to one another such that an overall length of the extended configuration is greater than the retracted configuration.

The upper frame 500 is optionally slidingly engaged with the intermediate frame 400 for sliding between retracted and extended configurations of strut 200. The upper frame 500 is optionally pivotally coupled at an upper end thereof to the truss 110 (e.g., at pivot supports 532-1, 532-2). In some embodiments, one or more actuators 230 (e.g., two actuators 230-1, 230-2), such as dual-acting hydraulic telescoping cylinders or other suitable actuators, are coupled at a first end to the lower frame 300 and at a second end to the intermediate frame 400 for selectively extending and retracting the strut 200. In some embodiments, one or more actuators 250 (e.g., two actuators 250-1, 250-2), such as dual-acting hydraulic telescoping cylinders or other suitable actuators, are coupled at a first end to the intermediate frame 400 and at a second end to the upper frame 500 for selectively extending and retracting the strut 200.

Figure 1:
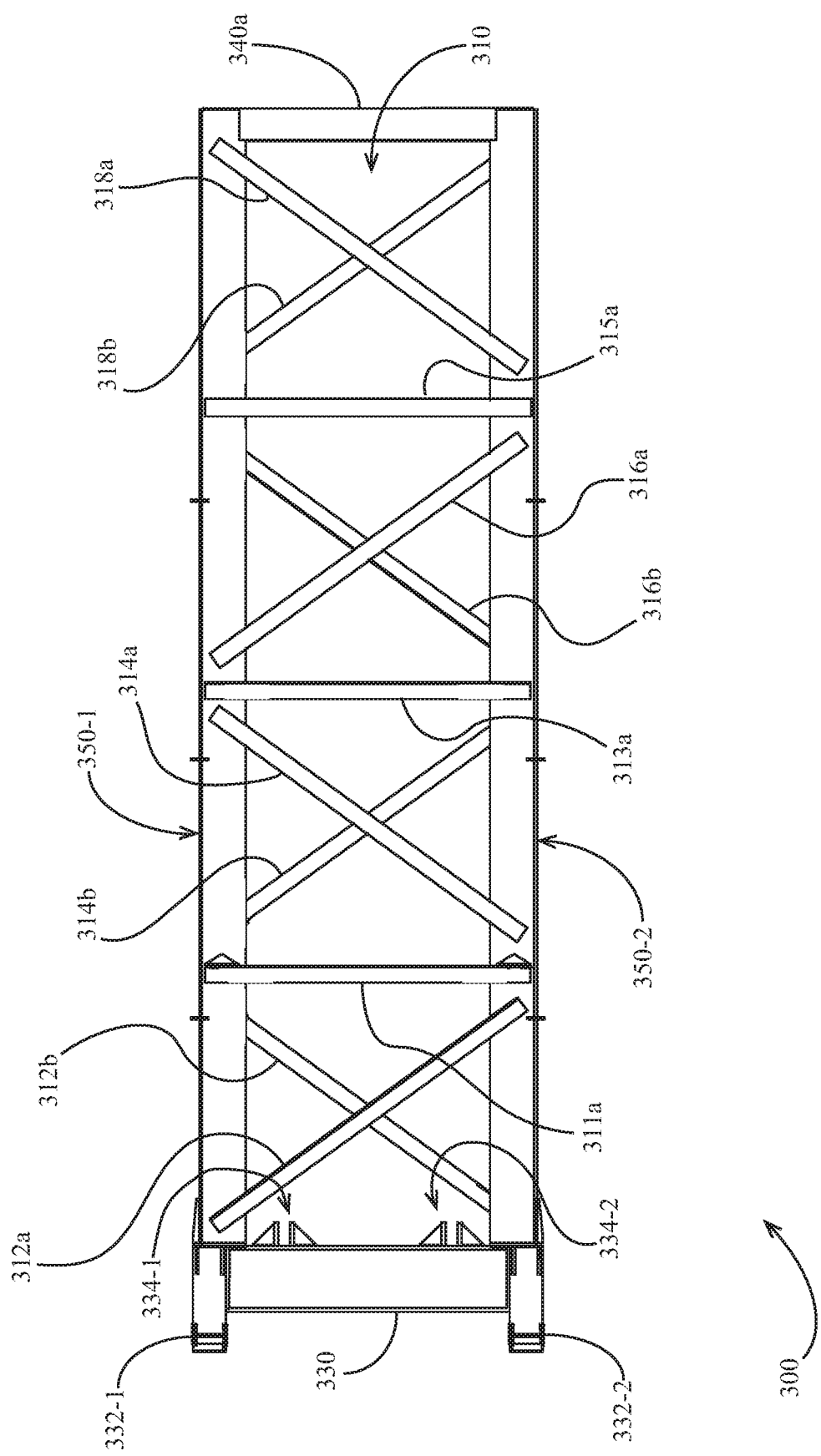
FIG. 1 is a plan view of an embodiment of a bottom portion of the strut of FIG. 10.
Figure 4:
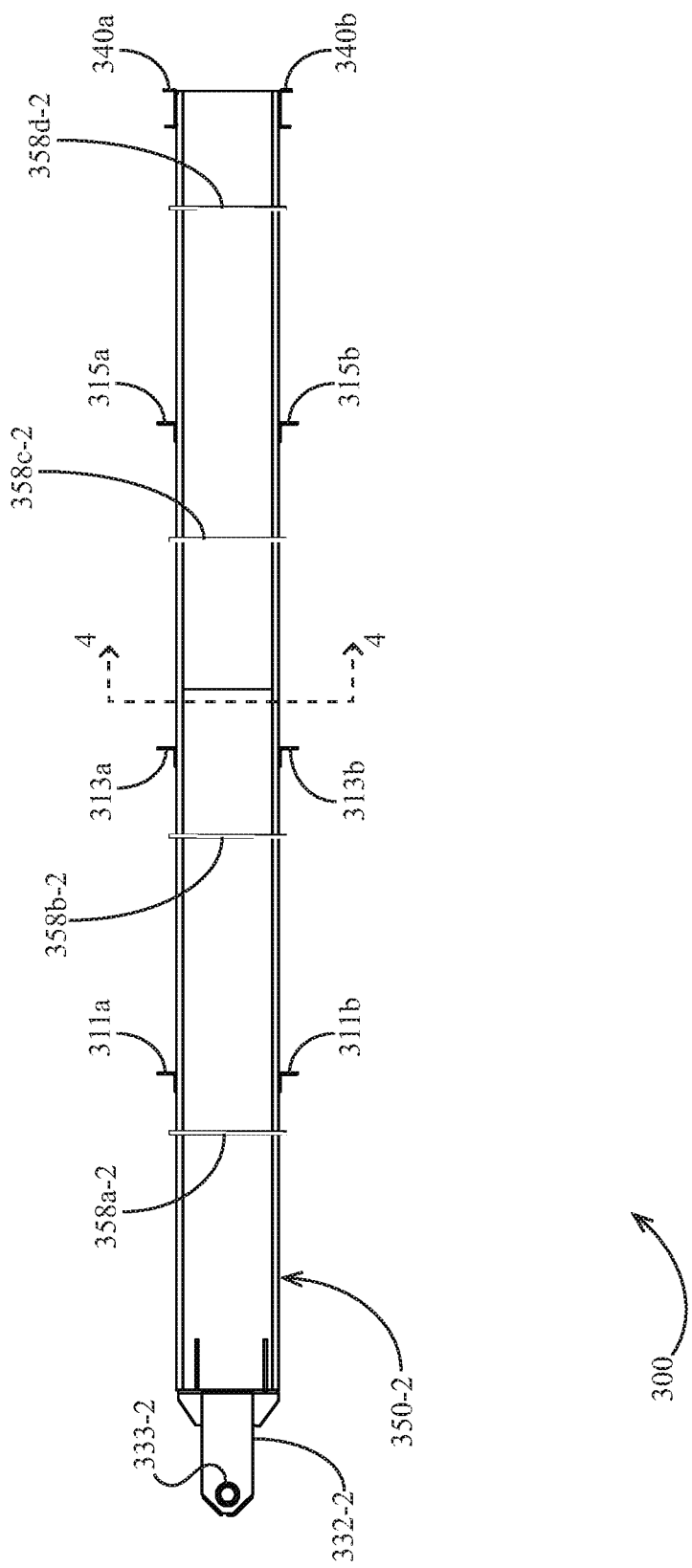
FIG. 4 is a side elevation view of the strut lower portion of FIG. 1 with certain angled braces not shown.
Figure 7:
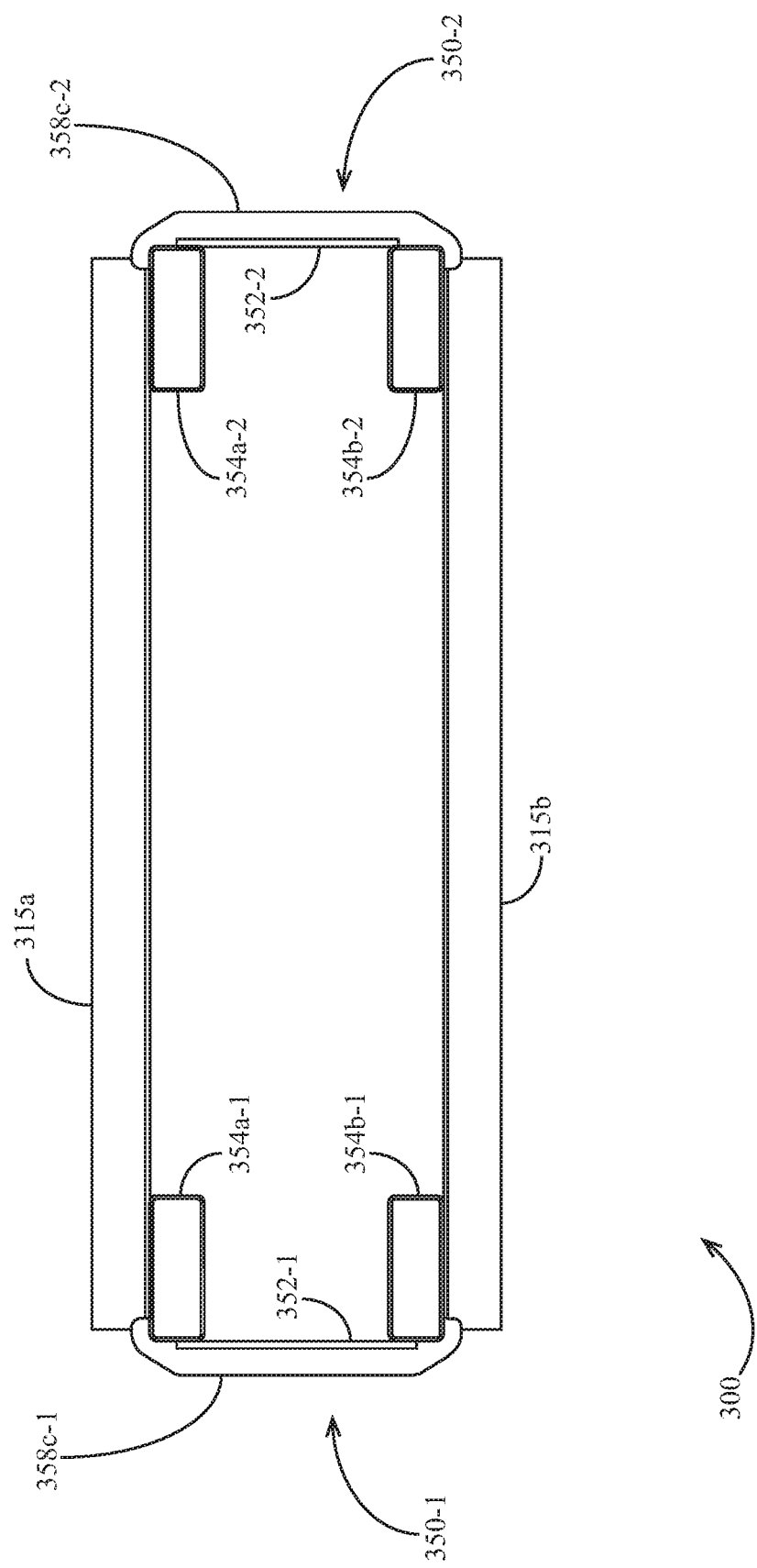
FIG. 7 is a sectional view along section 4-4 of FIG. 4.

Referring to FIGS. 1, 4 and 7, the lower frame 300 optionally comprises first and second supports 350-1, 350-2. The supports 350-1, 350-2 are optionally longitudinally extending and optionally generally parallel. The supports 350-1, 350-2 are optionally transversely spaced apart. Each support 350 optionally comprises one or more beams, gussets, side plates, or other structure.

As illustrated in FIG. 7, each support 350 comprises first and second spaced apart beams 354a, 354b joined and spaced apart by a side plate 352. In various other embodiments, each support 350 may comprise a single beam of any cross-section (e.g., closed polygon, open polygon, square, partial square, rectangular, partially rectangular, cylindrical, semi-cylindrical, closed ellipse, partial ellipse, etc.). One or more gussets 358 (e.g., gussets 358a, 358b, 358c, 358d) are optionally mounted to each support 350 to strengthen the support. The supports 350-1, 350-2 are optionally joined at or near a lower end by a transversely extending base 330 which may comprise one or more braces, one or more beams, or other structure. In some embodiments, one or more actuator supports 334 (e.g., pivot supports) are mounted to the base 330 or other portion of the frame 300. In some embodiments, two supports 334-1, 334-2 are mounted to the base 330. The actuator supports 334 are optionally mounted to a generally upward-facing surface of the base 330 or other structure. The base 330 optionally supports one or more pivot supports 332 (e.g., 332-1, 332-2) which include pivots 333 (e.g., 333-1, 333-2). The pivots 333-1, 333-2 are optionally aligned along a generally transverse axis and are optionally configured to be mounted to the undercarriage 150.

As described below in more detail according to various embodiments, the supports 350-1, 350-2 are optionally joined and/or supported by bracing 310 which optionally comprises one or more angled braces and/or one or more transversely extending braces.

One or more transversely extending braces (e.g., braces 311, 313, 315) are mounted to and extend between the supports 350-1, 350-2. In some embodiments, a first set of braces (e.g., braces 311a, 313a, 315a) is mounted to a first side of the support 350-1 and a first side of the support 350-2. In some embodiments, a second set of braces (e.g., braces 311b, 313b, 315b) is mounted to a second side (e.g., opposing the first side) of the support 350-1 and a second side (e.g., opposing the first side) of the support 350-2. In other embodiments, one or more braces may be alternatively or additionally mounted to surfaces of the supports 350-1, 350-2 that face one another (e.g., internal and/or inboard-facing surfaces of the frame 300).

One or more transversely extending angled braces (e.g., braces 312, 314, 316, 318) are mounted to and extend between the supports 350-1, 350-2. In some embodiments, a first set of braces (e.g., braces 312a, 314a, 316a, 318a) is mounted to a first side of the support 350-1 and a first side of the support 350-2. In some embodiments, a second set of braces (e.g., 312b, 314b, 316b, 318b) is mounted to a second side (e.g., opposing the first side) of the support 350-1 and a second side (e.g., opposing the first side) of the support 350-2. In other embodiments, one or more angled braces may be alternatively or additionally mounted to surfaces of the supports 350-1, 350-2 that face one another (e.g., internal and/or inboard-facing surfaces of the frame 300).

Figure 2:
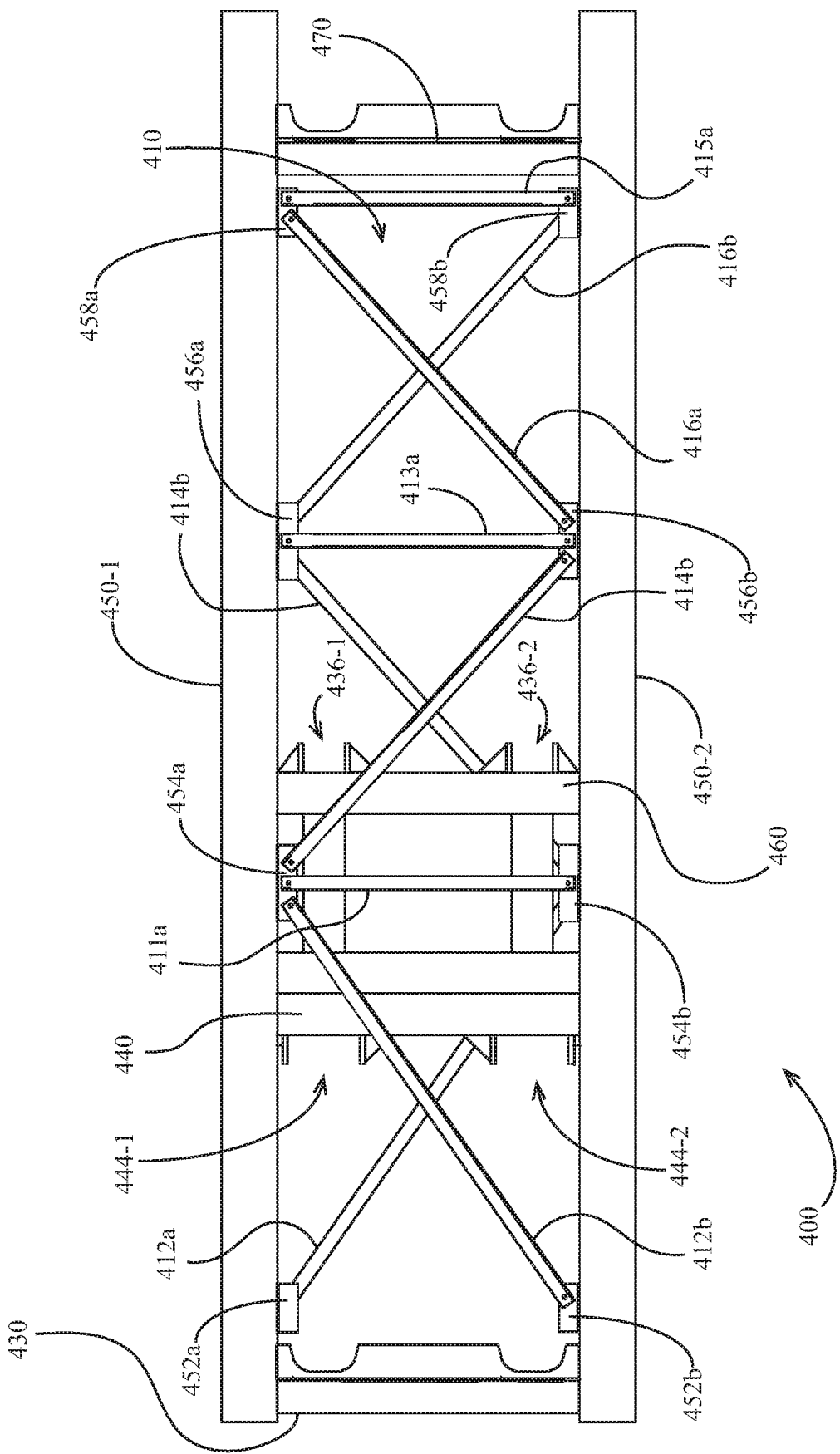
FIG. 2 is a plan view of an embodiment of an intermediate portion of the strut of FIG. 10.
Figure 5:
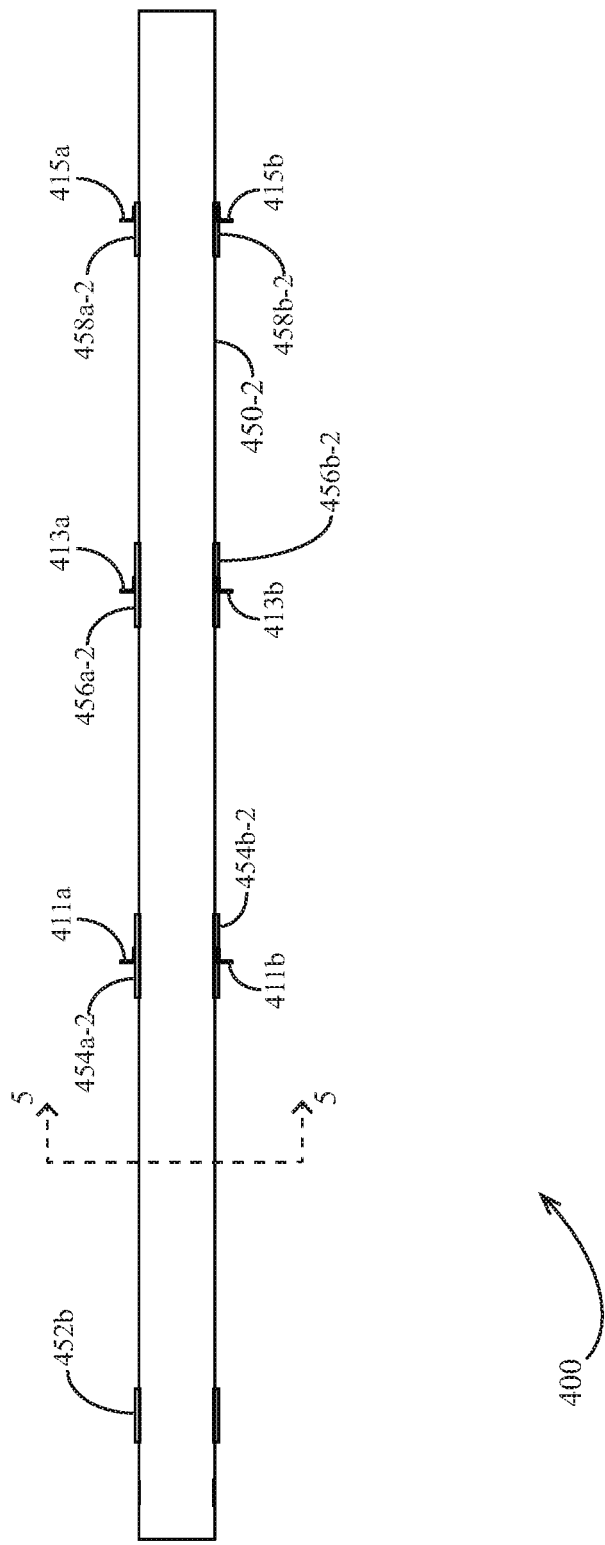
FIG. 5 is a side elevation view of the strut intermediate portion of FIG. 2 with certain angled braces not shown.
Figure 8:
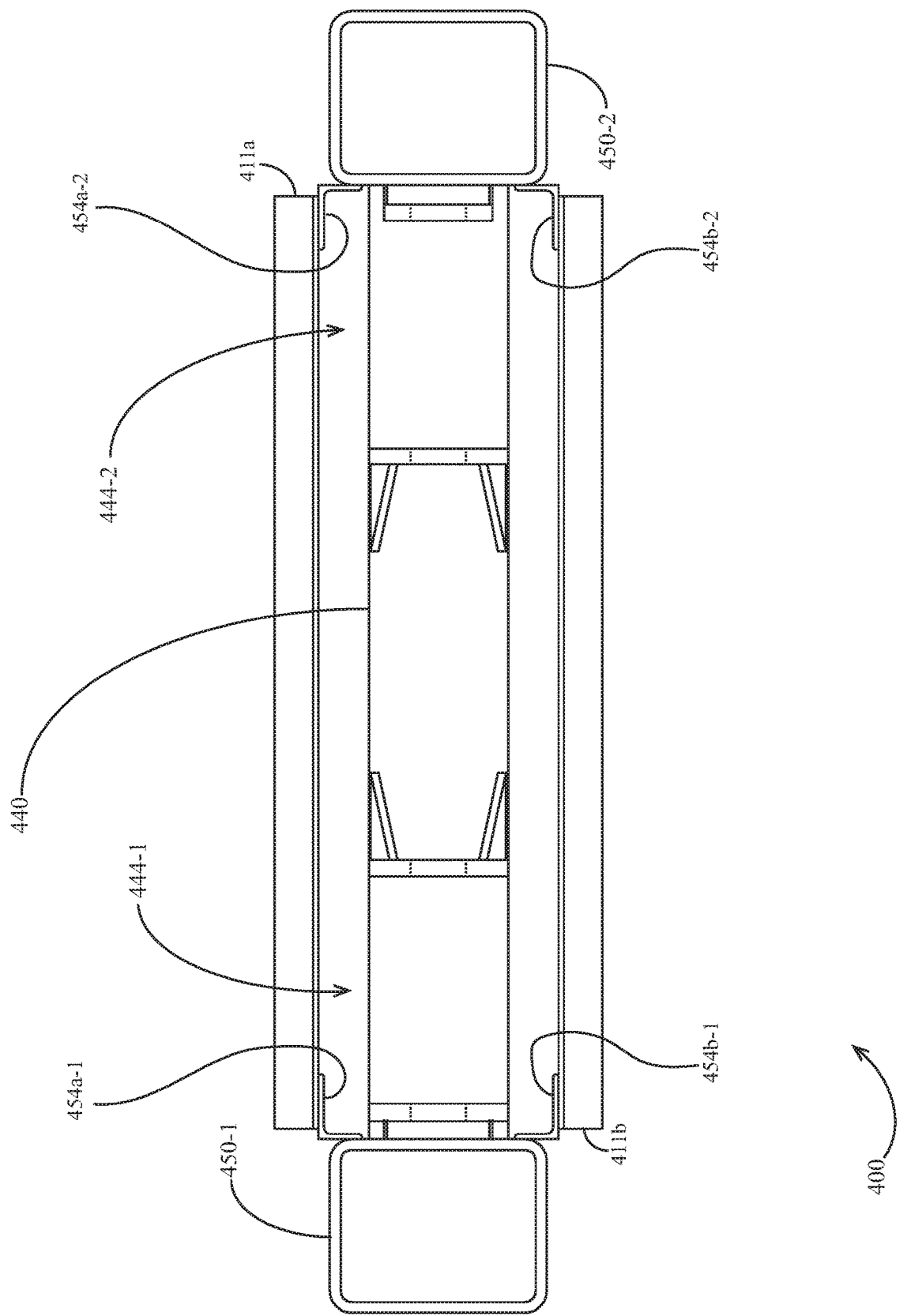
FIG. 8 is a sectional view along section 5-5 of FIG. 5.

Referring to FIGS. 2, 5, and 8, the lower frame 400 optionally comprises first and second supports 450-1, 450-2. The supports 450-1, 450-2 are optionally longitudinally extending and optionally generally parallel. The supports 450-1, 450-2 are optionally transversely spaced apart. Each support 450 optionally comprises one or more beams, gussets, side plates, or other structure.

As illustrated in FIG. 8, each support 450 comprises a beam which according to various embodiments may be of any cross-section (e.g., closed polygon, open polygon, square, partial square, rectangular, partially rectangular, cylindrical, semi-cylindrical, closed ellipse, partial ellipse, etc.).

The supports 450-1, 450-2 are optionally joined by cross-supports 430, 440, 460, 470, which may each comprise one or more braces, one or more beams, or other structure. In some embodiments, one or more actuator supports 444 (e.g., pivot supports) are mounted to the cross-support 440 and oriented toward the lower end of the frame 400. In some embodiments, one or more actuator supports 436 (e.g., pivot supports) are mounted to the cross-support 460 and oriented toward the upper end of the frame 400.

As described below in more detail according to various embodiments, the supports 450-1, 450-2 are optionally joined and/or supported by bracing 410 which optionally comprises one or more angled braces and/or one or more transversely extending braces. The bracing 410 is optionally at least partially supported inboard of the supports 450 (e.g., on one or more brackets which may be mounted to the supports 450 such as to inboard surfaces thereof).

One or more angled braces (e.g., braces 412, 414, 416) are optionally supported (e.g., indirectly) by and extend between the supports 450-1, 450-2. In some embodiments, a first set of braces (e.g., braces 412a, 414a, 416a) is spaced apart from a second set of braces (e.g., braces 412b, 414b, 416b). In some embodiments, the first set of braces is supported on one or more brackets (e.g., brackets 452, 454, 456, 458). The brackets optionally comprise angle brackets. The brackets 452 are optionally mounted on inboard surfaces of the supports 450.

One or more transversely extending braces (e.g., braces 411, 413, 415) are optionally supported (e.g., indirectly) by and extend between the supports 450-1, 450-2. In some embodiments, a first set of braces (e.g., braces 411a, 413a, 415a) is spaced apart from a second set of braces (e.g., braces 411b, 413b, 415b). In some embodiments, the first set of braces is supported on one or more brackets (e.g., brackets 452a, 452b, 452c, 452d). The brackets 452 optionally comprise angle brackets. The brackets 452 are optionally mounted on inboard surfaces of the supports 450.

Figure 3:
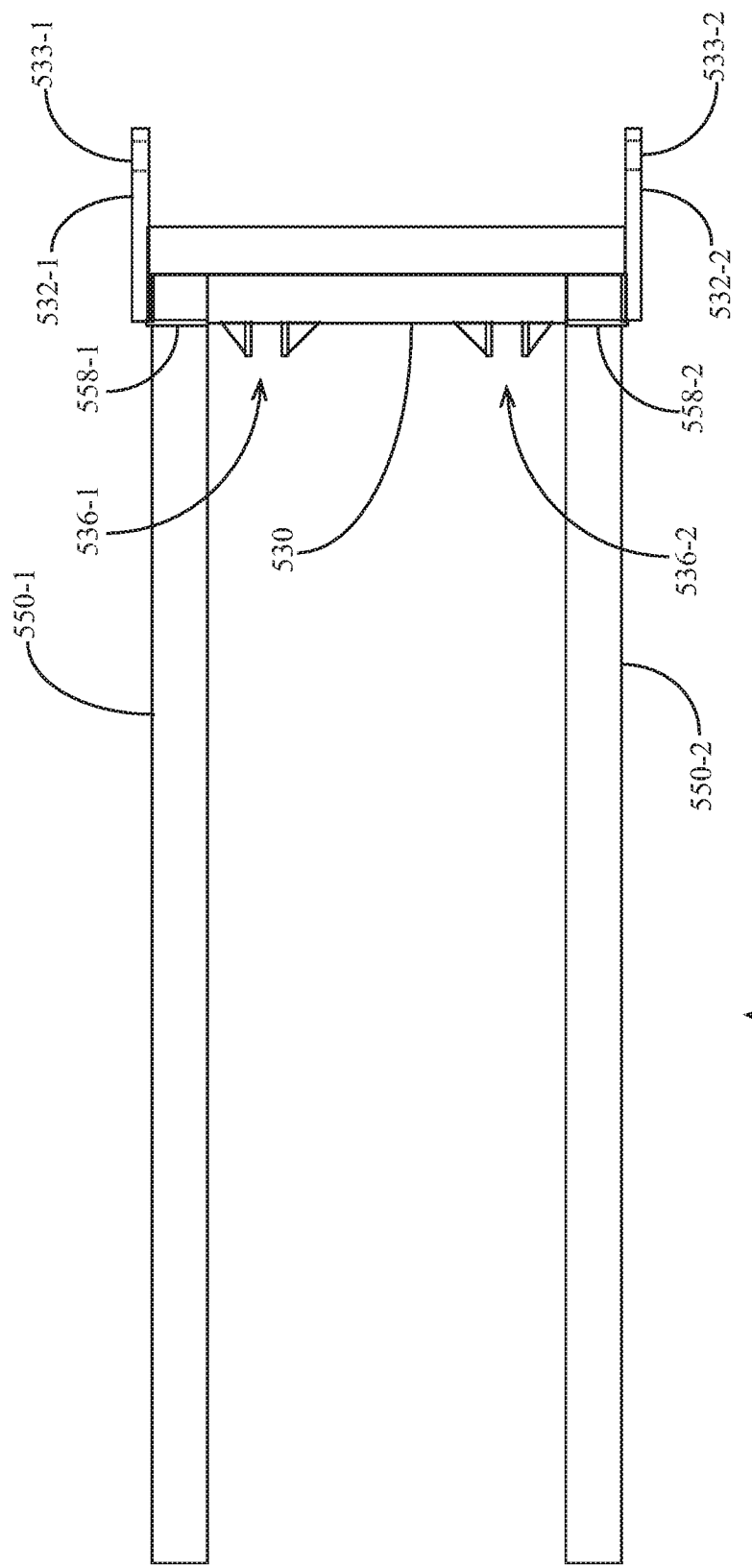
FIG. 3 is a plan view of an embodiment of an upper portion of the strut of FIG. 10.
Figure 6:
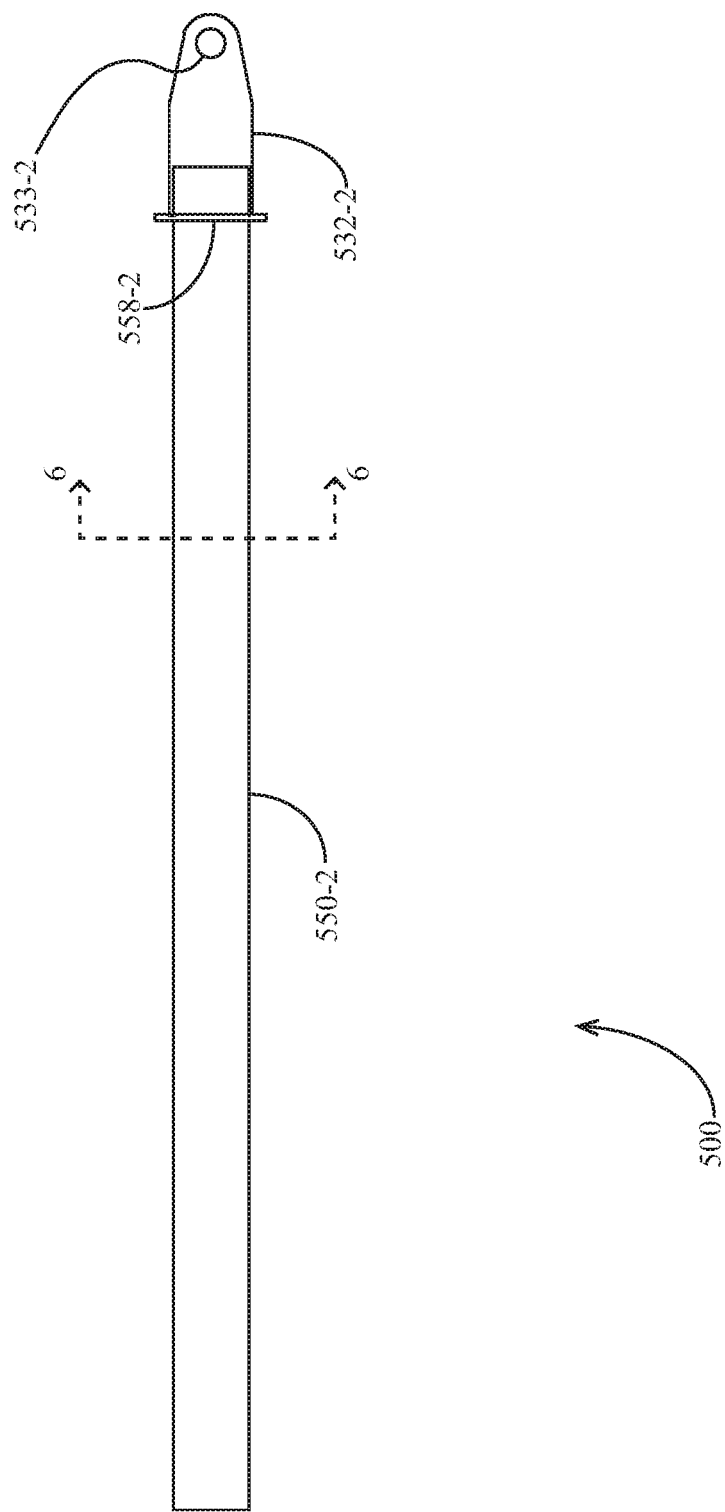
FIG. 6 is a side elevation view of the strut upper portion of FIG. 3.
Figure 9:
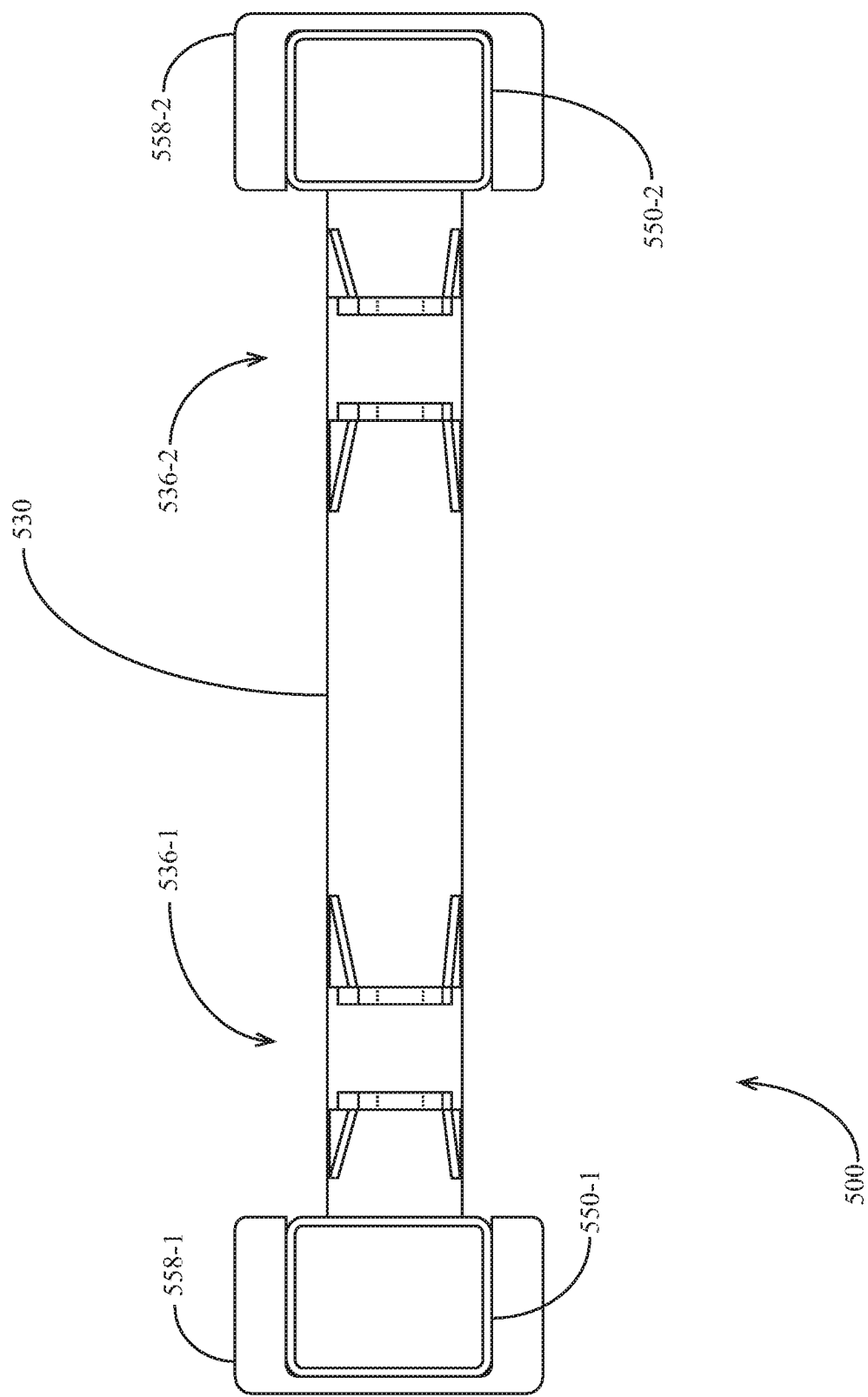
FIG. 9 is a sectional view along section 6-6 of FIG. 6.

Referring to FIGS. 3, 6, and 9, the upper frame 500 optionally comprises first and second supports 550-1, 550-2. The supports 550-1, 550-2 are optionally longitudinally extending and optionally generally parallel. The supports 550-1, 550-2 are optionally transversely spaced apart.

As illustrated in FIG. 9, each support 550 comprises a beam which may be of any cross-section (e.g., closed polygon, open polygon, square, partial square, rectangular, partially rectangular, cylindrical, semi-cylindrical, closed ellipse, partial ellipse, etc.). In some embodiments, a stop 558 is optionally mounted to each support 550 and disposed to contact the intermediate frame 400 in a retracted configuration and/or to prevent the strut 200 from retracting farther than a predetermined retracted configuration. The supports 550-1, 550-2 are optionally joined at or near an upper end by a transversely extending cross-support 530 which may comprise one or more braces, one or more beams, or other structure. In some embodiments, one or more actuator supports 536 (e.g., pivot supports) are mounted to the cross-support 530 or other portion of the frame 500. The actuator supports 536 are optionally mounted to a generally downward-facing surface of the cross-support 530 or other structure. The cross-support 530 optionally supports one or more pivot supports 532 (e.g., 532-1, 532-2) which may comprise plates and which optionally include pivots 533 (e.g., 533-1, 533-2). The pivots 533-1, 533-2 are optionally aligned along a generally transverse axis and are optionally configured to be mounted to the truss 110.

Figure 12:
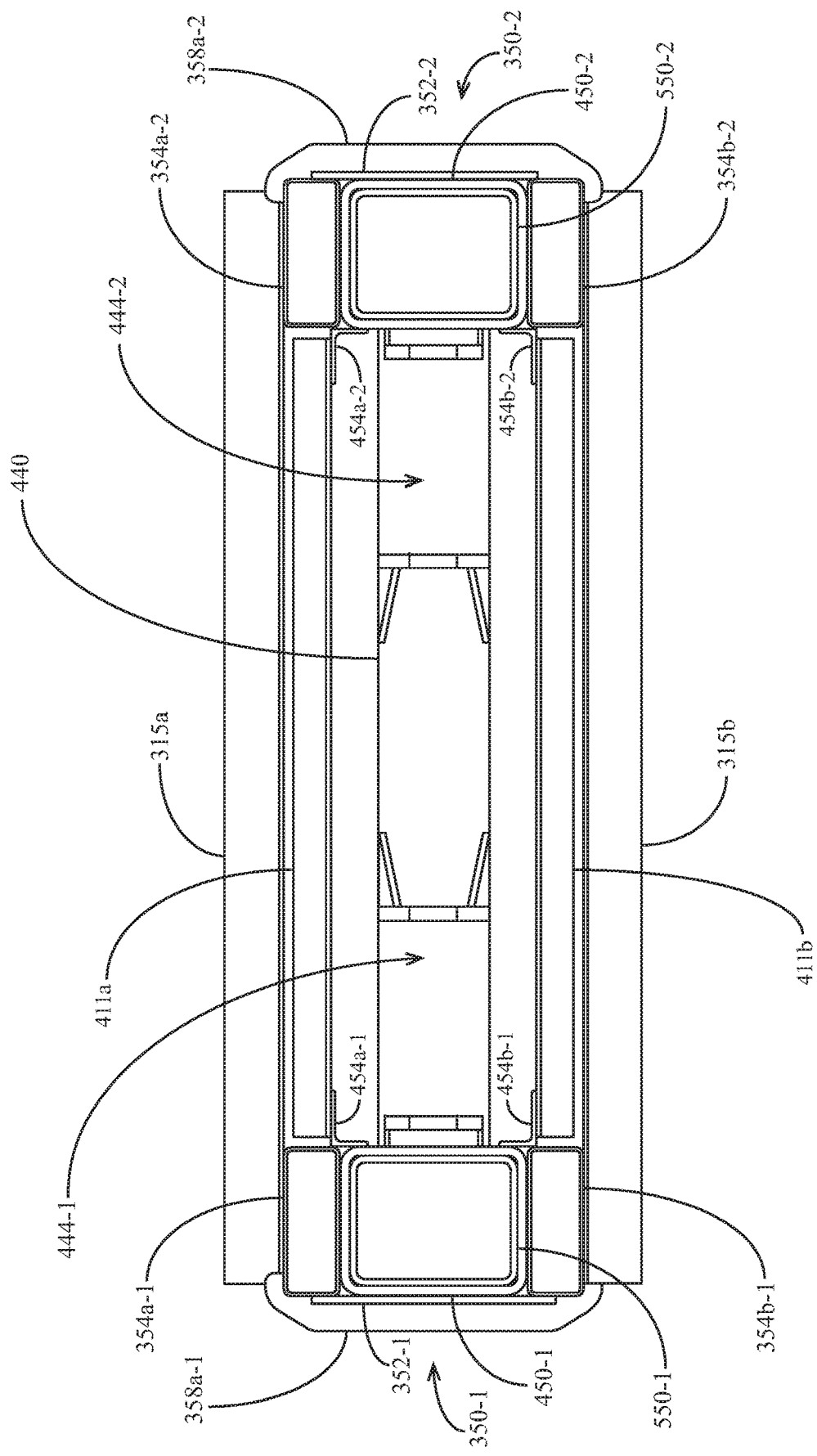
FIG. 12 is a sectional view along section 11A-11A of FIG. 11.
Figure 13:
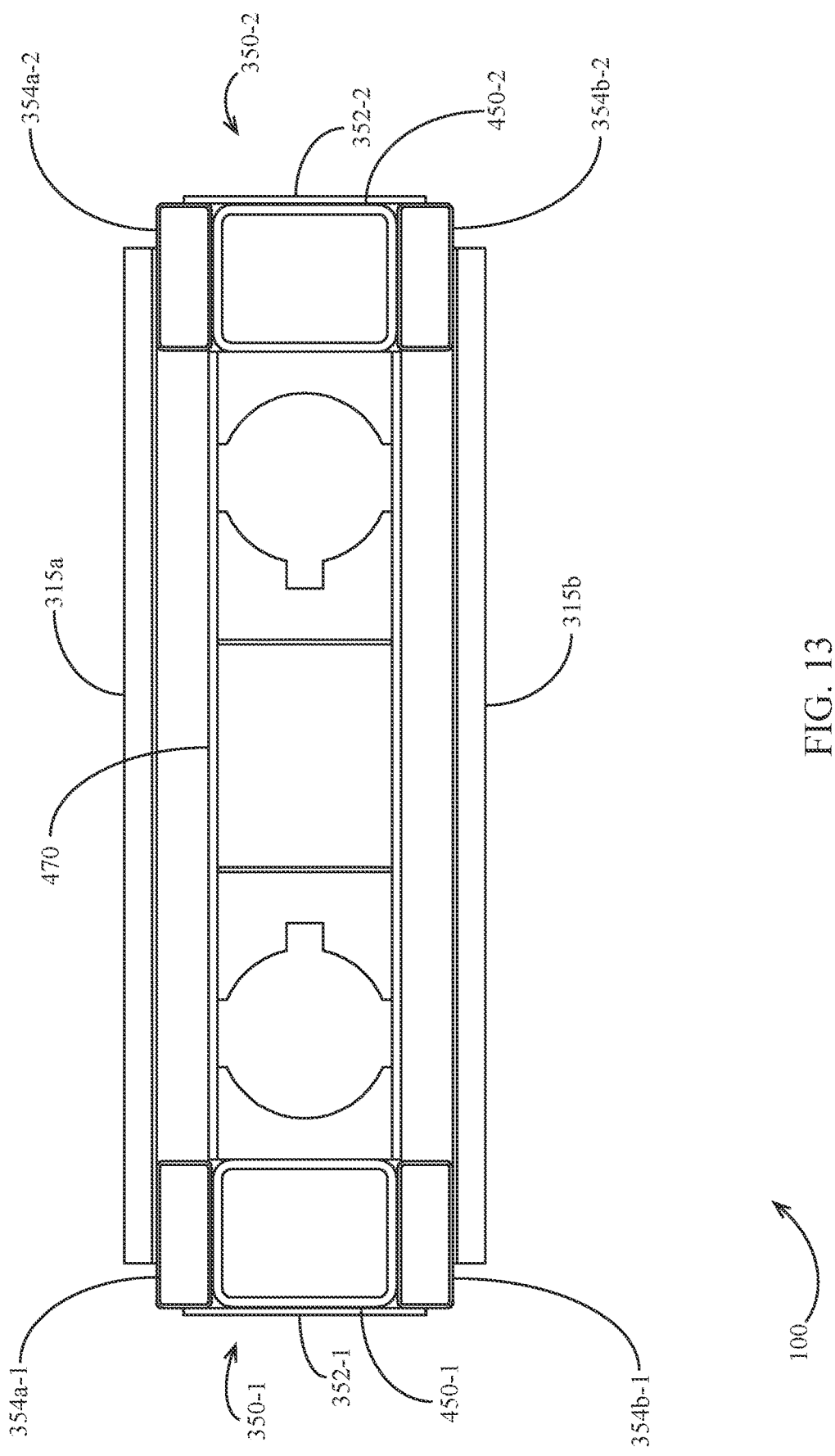
FIG. 13 is a sectional view along section 11B-11B of FIG. 11.

Referring to FIGS. 12-13, each support 550 of the upper frame 500 is optionally slidingly engaged with (e.g., at least partially received inside) a corresponding support 450 of the intermediate frame 400. Each support 450 of the intermediate frame is optionally slidingly engaged with a corresponding support 350 of the lower frame 300 (e.g., by at least partially received between the beams 354a, 354b). At least some braces (e.g., braces 411a, 411b) of the frame 400 are disposed inboard of the beams 354a, 354b such that the support 350 is able to slide over the support 450 without interference. At least some braces (e.g., braces 315a, 315b) of the frame 300 are sufficiently spaced apart to allow at least some braces (e.g., braces 411a, 411b) to pass therebetween without interference as the strut 200 reconfigures (e.g., slides) into the retracted position.

Figure 17:
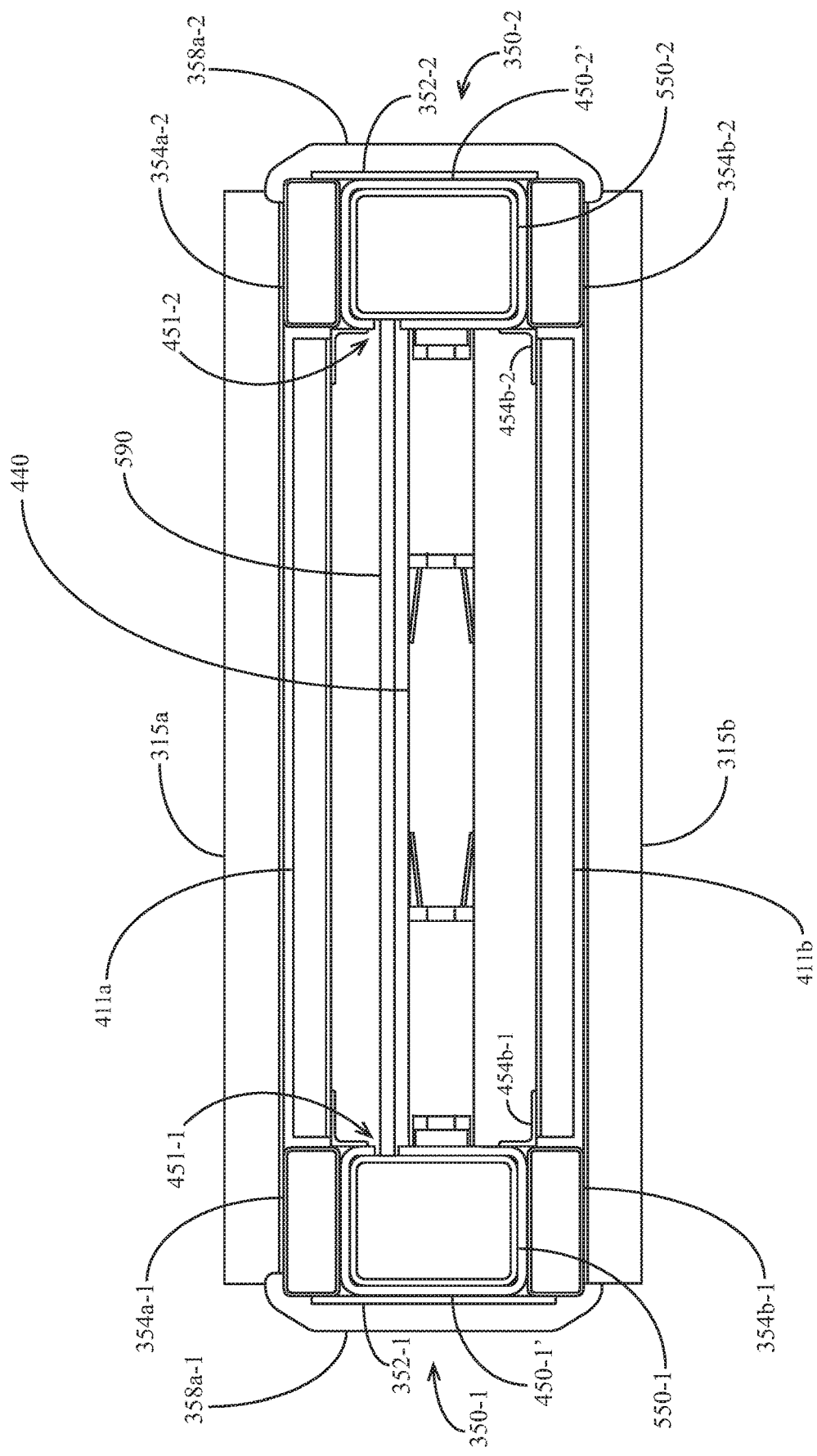
FIG. 17 illustrates an alternative embodiment of a strut along the sectional view of FIG. 12.

In some alternative embodiments such as that shown in FIG. 17, the upper frame 500 includes one or more braces (e.g., brace 590) mounted to and/or extending between the supports 550. The brace 590 is optionally supported by (e.g., mounted to or indirectly supported by) inboard surfaces of the supports 550-1, 550-2. In some such embodiments, a modified support 450-1', 450-2' of the intermediate frame 400 can be provided, which optionally includes a slot 451 sized to allow the brace 590 to pass therethrough for reconfiguration of the strut 200.

Figure 14:
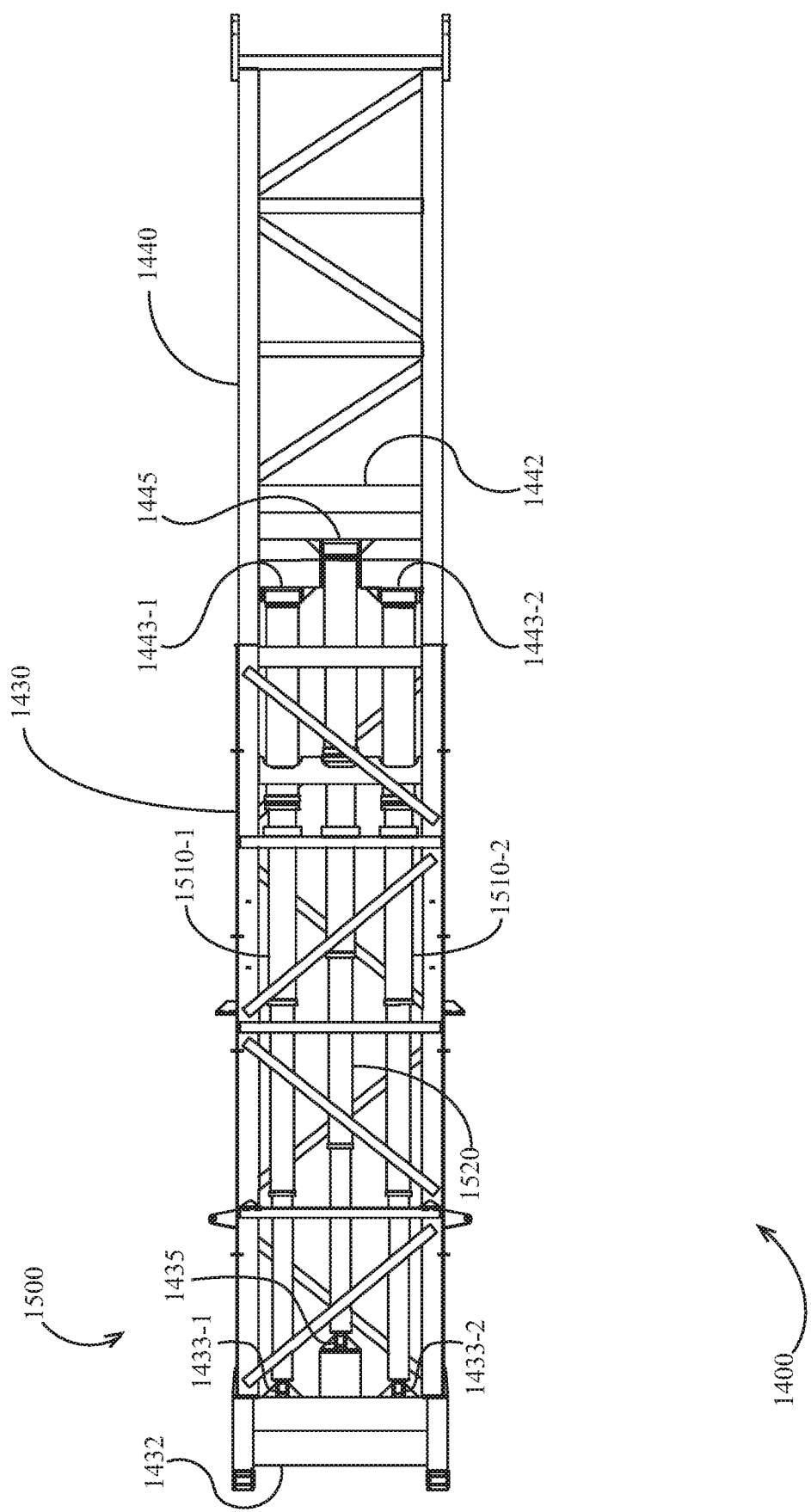
FIG. 14 is a plan view of another embodiment of a strut in an extended configuration.
Figure 15:
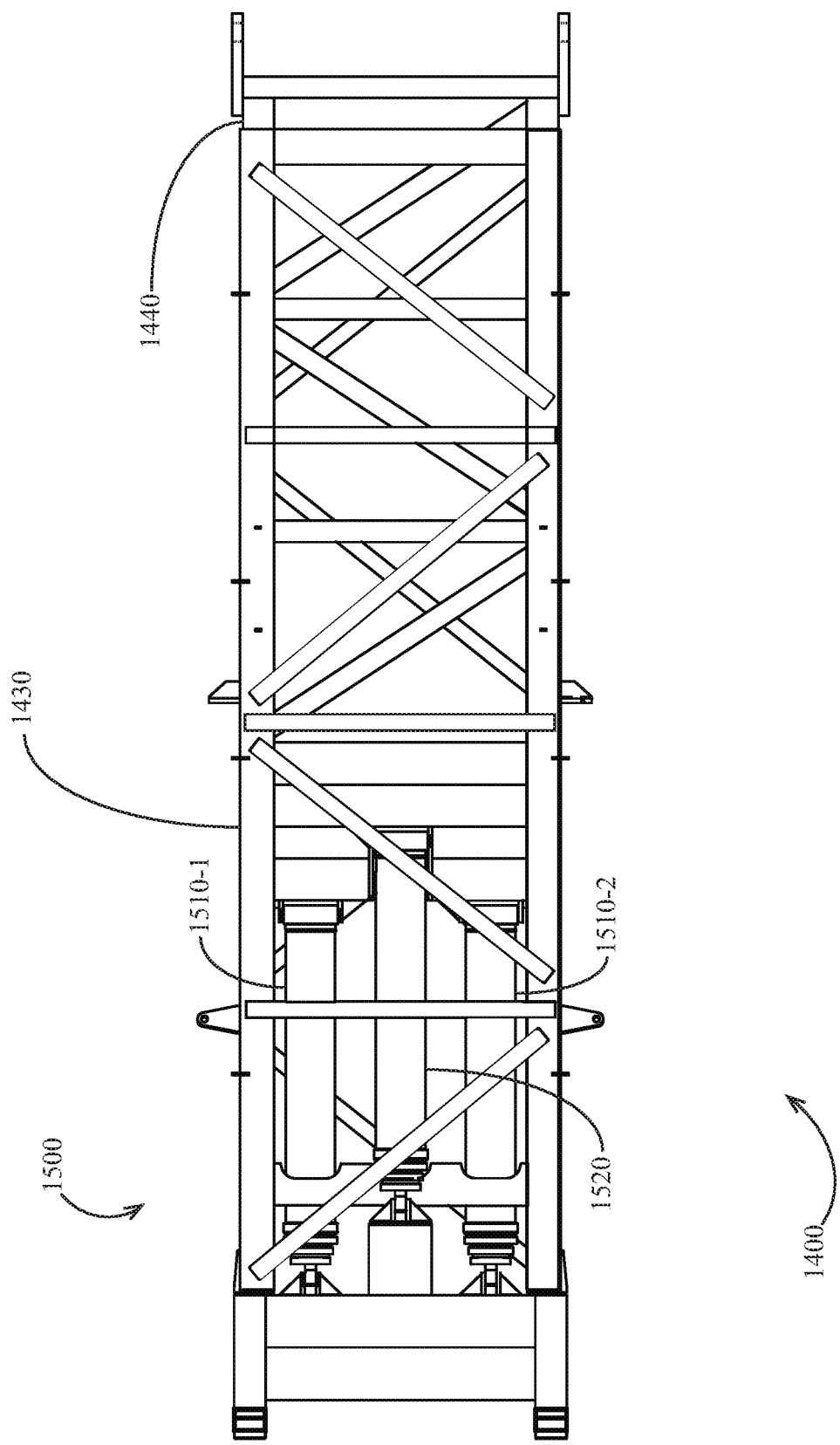
FIG. 15 is a plan view of another embodiment of a strut in a retracted configuration.

Referring to FIGS. 14 and 15, an alternative embodiment of a strut 1400 is illustrated having two actuators 1510-1, 1510-2 and an actuator 1520 optionally longitudinally offset from the actuators 1510. The strut 1400 optionally comprises a lower frame 1430 slidingly engaged with an upper frame 1440 which optionally have at least some common features with the lower frame 300 and intermediate frame 400, respectively, of the strut 200 described above.

The actuators 1510 are optionally coupled (e.g., pivotally coupled) to actuator supports 1433 of the lower frame 1430. The actuator 1520 is optionally coupled (e.g., pivotally coupled) to an actuator support 1435. The actuator supports 1433, 1435 are optionally mounted to a base 1432 of the lower frame 1430. The actuator support 1435 is optionally offset (e.g., longitudinally offset) from the actuator supports 1433.

The actuators 1510 are optionally coupled (e.g., pivotally coupled) to actuator supports 1443 of the upper frame 1440. The actuator 1520 is optionally coupled (e.g., pivotally coupled) to an actuator support 1445. The actuator supports 1443, 1445 are optionally mounted to a base 1442 of the upper frame 1440. The actuator support 1445 is optionally offset (e.g., longitudinally offset) from the actuator supports 1443.

Unless otherwise indicated expressly or by the context or function of various components, in some embodiments the components described herein may be made of metal such as steel. In some embodiments, components including metal components described or illustrated herein as being connected (e.g., joined, mounted, etc.) may be connected by welding, fasteners, or other suitable methods or structure.

Ranges recited herein are intended to inclusively recite all values within the range provided in addition to the maximum and minimum range values. Headings used herein are simply for convenience of the reader and are not intended to be understood as limiting or used for any other purpose.

Although various embodiments have been described above, the details and features of the disclosed embodiments are not intended to be limiting, as many variations and modifications will be readily apparent to those of skill in the art. Accordingly, the scope of the present disclosure is intended to be interpreted broadly and to include all variations and modifications within the scope and spirit of the appended claims and their equivalents.

The invention claimed is:

1. A conveyor strut for modifying the elevation of a conveyor truss relative to a conveyor undercarriage, comprising:
   a lower frame having a first pair of supports connected by a first plurality of braces, said lower frame pivotally coupled to the conveyor undercarriage by a first pair of pivot supports;
   an intermediate frame slidingly engaged with said lower frame, said intermediate frame having a second pair of supports connected by a second plurality of braces;
   an upper frame slidingly engaged with said intermediate frame, said upper frame pivotally coupled to the conveyor truss by a second pair of pivot supports; and
   at least a first actuator coupled to at least one of said upper frame and said lower frame, said first actuator configured to alternately extend and retract the strut in order to alternately raise and lower the conveyor truss relative to the conveyor undercarriage.

2. The conveyor strut of claim 1, wherein the upper frame has a third pair of supports connected by a third plurality of braces, the conveyor strut further defining an extended configuration and a retracted configuration.

3. The conveyor strut of claim 2, wherein each support of said upper frame is slidingly engaged with a corresponding support of said intermediate frame.

4. The conveyor strut of claim 2, wherein said third plurality of braces are supported on inboard surfaces of the third pair of supports.

5. The conveyor strut of claim 4, wherein each support of said intermediate frame includes a slot sized to allow said third plurality of braces to pass therebetween.

6. The conveyor strut of claim 1, wherein each support of said intermediate frame is slidingly engaged with a corresponding support of said lower frame.

7. The conveyor strut of claim 1, wherein at least one of said second plurality of braces is disposed inboard of said first pair of supports such that said first pair of supports is slideable over said second pair of supports without interference.

8. The conveyor strut of claim 1, wherein the first plurality of braces are sufficiently spaced apart to allow at least one of said second plurality of braces to pass therebetween.

9. The conveyor strut of claim 8, wherein the upper frame has a third pair of supports connected by a third plurality of braces.

10. The conveyor strut of claim 9, wherein each support of said upper frame is slidingly engaged with a corresponding support of said intermediate frame.

11. The conveyor strut of claim 9, wherein said third plurality of braces are supported on inboard surfaces of the third pair of supports.

12. The conveyor strut of claim 11, wherein each support of said intermediate frame includes a slot sized to allow said third plurality of braces to pass therebetween.

13. A conveyor comprising:
   an undercarriage;
   a conveyor truss supporting a plurality of idler assemblies, a head pulley and a tail pulley;
   a telescoping conveyor strut operably supporting said conveyor truss, the conveyor strut comprising:
      a lower frame having a first pair of supports connected by a first plurality of braces, said lower frame pivotally coupled to said undercarriage;
      an intermediate frame slidingly engaged with said lower frame, said intermediate frame having a second pair of supports connected by a second plurality of braces;
      an upper frame slidingly engaged with said intermediate frame, said upper frame pivotally coupled to said conveyor truss; and at least a first actuator coupled to at least one of said upper and lower frame, said first actuator configured to alternately extend and retract said telescoping conveyor strut in order to alternately raise and lower said conveyor truss relative to said conveyor undercarriage.

14. The conveyor of claim 13, wherein said conveyor truss is a telescopic truss.

15. The conveyor of claim 13, wherein the upper frame has a third pair of supports connected by a third plurality of braces, the conveyor strut further defining an extended configuration and a retracted configuration.

16. The conveyor of claim 15, wherein each support of said upper frame is slidingly engaged with a corresponding support of said intermediate frame.

17. The conveyor of claim 13, wherein each support of said intermediate frame is slidingly engaged with a corresponding support of said lower frame.

18. The conveyor of claim 13, wherein at least one of said second plurality of braces is disposed inboard of said first pair of supports such that said first pair of supports is slideable over said second pair of supports without interference.

19. The conveyor of claim 13, wherein the first plurality of braces are sufficiently spaced apart to allow at least one of said second plurality of braces to pass therebetween.

20. The conveyor of claim 19, wherein the upper frame has a third pair of supports connected by a third plurality of braces.

21. The conveyor of claim 13, further comprising:

a second actuator coupled to at least one of said upper frame and said lower frame, said second actuator configured to alternately extend and retract the strut in order to alternately raise and lower the conveyor truss relative to the conveyor undercarriage.

22. The conveyor of claim 21, further comprising:

a third actuator coupled to at least one of said upper frame and said lower frame, said third actuator configured to alternately extend and retract the strut in order to alternately raise and lower the conveyor truss relative to the conveyor undercarriage.

23. The conveyor of claim 22, wherein said first actuator is aligned with said second actuator along a direction of extension of said first actuator.

24. The conveyor of claim 22, wherein said third actuator is offset from with said first actuator and said second actuator along a direction of extension of said first actuator.

25. The conveyor of claim 22, wherein said first and second actuators are coupled to respective first and second actuator supports, and wherein said third actuator is coupled to a third actuator support, said third actuator support being offset from said first and second actuator supports along a direction of extension of said third actuator.

* * * * *